(12) United States Patent
Okumura et al.

(10) Patent No.: US 7,755,286 B2
(45) Date of Patent: Jul. 13, 2010

(54) GLASS FILM, PROCESS FOR PRODUCTION THEREOF, AND OPTICAL ELECTRONIC DEVICE

(75) Inventors: Tomohiro Okumura, Osaka (JP); Mitsuo Saitoh, Osaka (JP); Hironobu Inoue, Osaka (JP); Motoi Hatanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 254 days.

(21) Appl. No.: 11/915,467

(22) PCT Filed: Aug. 3, 2006

(86) PCT No.: PCT/JP2006/315430

§ 371 (c)(1),
(2), (4) Date: Nov. 26, 2007

(87) PCT Pub. No.: WO2007/023658

PCT Pub. Date: Mar. 1, 2007

(65) Prior Publication Data

US 2009/0224672 A1 Sep. 10, 2009

(30) Foreign Application Priority Data

Aug. 25, 2005  (JP)  ............................. 2005-243837

(51) Int. Cl.
*H01J 17/49* (2006.01)

(52) U.S. Cl. .......................... 313/586; 65/30.1; 428/325

(58) Field of Classification Search ......... 313/528–587; 65/30.1; 428/325
See application file for complete search history.

(56) References Cited

U.S. PATENT DOCUMENTS 5,766,680 A   6/1998   Schmidt et al.

(Continued)

FOREIGN PATENT DOCUMENTS

JP        62-260372       11/1987

(Continued)

OTHER PUBLICATIONS

English Language Abstract of JP 4-247885.

(Continued)

*Primary Examiner*—Joseph L Williams
*Assistant Examiner*—Brenitra M Lee
(74) *Attorney, Agent, or Firm*—Greenblum & Bernstein, P.L.C.

(57) ABSTRACT

Disclosed is a dense silicon oxide film having a high insulation resistance, which is a glass film having a certain level of thickness. Specifically, disclosed are a silicon oxide film, and a glass film comprising the silicon oxide film and silica particles incorporated in the silicon oxide film. The glass film can be produced by a process comprising the steps of: applying a paste comprising silica particles, an organic silicon compound which is in a liquid form at room temperature and water onto a substrate; and oxidizing the organic silicon compound in the paste.

19 Claims, 4 Drawing Sheets

U.S. PATENT DOCUMENTS

| | | |
|---|---|---|
| 6,160,345 A | 12/2000 | Tanaka et al. |
| 6,730,522 B1 | 5/2004 | Nakamura et al. |
| 2001/0005115 A1 | 6/2001 | Busio et al. |

FOREIGN PATENT DOCUMENTS

| | | |
|---|---|---|
| JP | 64-65029 | 3/1989 |
| JP | 4-247885 | 9/1992 |
| JP | 7-320645 | 12/1995 |
| JP | 10-500072 | 1/1998 |
| JP | 11-167861 | 6/1999 |
| JP | 2000-191324 | 7/2000 |
| JP | 2003-7217 | 1/2003 |
| JP | 2003-104755 | 4/2003 |
| JP | 2004-51468 | 2/2004 |
| JP | 2004-99994 | 4/2004 |
| JP | 2005-108691 | 4/2005 |

OTHER PUBLICATIONS

English Language Abstract of JP 62-26032.
English Language Abstract of JP 64-65029.
English Language Abstract of JP 2003-104755.
English Language Abstract of JP 2004-51468.
English Language Abstract of JP 2000-191324.
English Language Abstract of JP 2005-108691.
English Language Abstract of JP 2004-99994.
English Language Abstract of JP 11-167861.
English Language Abstract of JP 7-320645.

GLASS FILM, PROCESS FOR PRODUCTION THEREOF, AND OPTICAL ELECTRONIC DEVICE

TECHNICAL FIELD

The present invention relates to a glass film and a manufacturing method thereof and an optical electronic device with the glass film.

BACKGROUND ART

Glass films are widely used in electronic devices, and, for example, are used as inter-layer insulating films for semiconductors. Glass films can be produced from alkoxy silicon compounds. For example, a glass film can be made through hydrolysis and condensation reaction of an alkoxy silicon compound or an alkylalkoxy silicon compound in the presence of acid or base catalyst (see Patent Document 1 or 2, for example).

Further, the inter-layer insulating film for semiconductor devices is preferably a dense glass film (silicon oxide film) having a high voltage resistance characteristic, and so the film may be produced using the plasma CVD (Chemical Vapor Deposition) method (see Patent Document 3, for example). FIG. 1 is a cross-sectional view showing a configuration of an example of a plasma CVD apparatus. In FIG. 1, substrate 1 is placed upon lower electrode 10 provided inside vacuum container 9. Tetraethylorthosilicate (TEOS), helium and oxygen gas are supplied to substrate 1 through shower head 12 provided under upper electrode 11 from a gas supply device (not shown). The supplied gasses are evacuated by a pump (not shown), and the interior of vacuum container 9 is maintained at a predetermined pressure. High frequency power is supplied to upper electrode 11 with upper electrode high frequency power source 13, and high frequency power is supplied to lower electrode 10 with lower electrode high frequency power source 14.

On the other hand, the method of forming glass films using a paste mixed with glass particles, is also known. According to this method, a relatively thick glass film (approximately 10 μm, for example) can be formed (see Patent Document 4, for example). FIG. 2 shows an example of a flow of forming the film (a flow of forming a glass film in the front side of an AC-type PDP glass substrate of a triode structure).

As shown in FIG. 2A, dielectric paste 31 is applied to glass substrate 1 so as to cover display electrode 30 provided on glass substrate 1. Dielectric paste 31 contains glass particles 32 and liquid substance 33, which are dielectric materials. Glass particles 32 are of a particle size smaller than the thickness of the glass film to be formed. Liquid substance 33 contains binder 34 for bonding glass particles 32 (see FIG. 2B) and a solvent for adjusting the viscosity of the paste. Dielectric paste 31 is kneaded by a general kneading machine, and glass particles 32 are uniformly distributed.

The solvent contained in dielectric paste 31 applied on substrate 1 is evaporated, so that glass particles 32 are bonded by binder 34 (see FIG. 2B). Further, binder 34 is burned and removed by sintering processing, and dielectric layer 35 is obtained (see FIG. 2C). The sintering temperature is set at a temperature where the dielectric material does not melt and not fuse with display electrode 30.

Glass films are used as dielectric layers for plasma display panels ("PDDs") as well. The surface discharge type PDP of a triode structure shown in FIG. 3 includes: electrode pair 52 comprised of display electrodes X and Y placed adjacently in parallel on front plate 51; and address electrode A, arranged so as to be orthogonal to electrode pair 52. Dielectric layer 53 and protective layer 54 are provided on the back of the display surface of the front plate. The surface discharge cells (i.e. the main discharge cells in the display) are demarcated by display electrodes X and Y, and address discharge cells are demarcated by display electrode Y and address electrode A. The address discharge cells determine whether or not to light the unit light emitting area EU. Phosphor layer 55, provided so as to coat address electrode A, the inner surface of rear plate 56, and the inner surface of partition 57, is excited by ultraviolet rays produced by surface discharge between display electrodes X and Y to emit light. In order to effect full color display, phosphor layers 58R, 58G, 58B of three primary colors, R (red), G (green) and B (blue) are provided for each dot EG forming the display screen (see Patent Document 5).

FIG. 4 is a cross-sectional view where front plate 51 of the PDP shown in FIG. 3 is taken along a plane vertical to the longitudinal direction of display electrodes X and Y. Display electrodes X and Y each consist of transparent conductive film 52 and non-transparent conductive film 59. The dielectric layer is, for example, a glass film.

As one means of improving power efficiency of surface discharge and lowering the driving voltage of the PDP, the relative permittivity of the dielectric layer is lowered and the thickness is made thinner, thereby maintaining the capacitance of the capacitor between the display electrodes and lowering the driving voltage of the PDP. The glass film (silicon oxide film) formed by the CVD method is an example of a dielectric layer of low relative permittivity. The relative permittivity of a dielectric layer formed by a general liquid phase method is in approximately 10 to 13, and the relative permittivity of a dielectric layer formed by a gas phase method such as the CVD method is approximately 4 to 5.

FIG. 5 is a cross-sectional view of an example of PDP in which a glass film formed by the CVD method is used as a dielectric layer (see Patent Document 6). The PDP shown in FIG. 5 has: a front plate comprised of front plate 51, display electrode 52, metal oxide layer 53a, dielectric layer 53, and protective layer 54; and a rear panel comprised of rear plate 56, address electrode A, metal oxide layer 60, dielectric layer 61, partition 57, and phosphor layer 55. A discharge gas is sealed in discharge space 62. On front plate 51 where discharge electrode 52 is provided, metal oxide layer 53a is formed by the CVD method, and in addition, dielectric layer 53 consisting of glass films is formed by the CVD method.

Patent Document 1: Japanese Patent Application Laid-Open No. 2005-108691

Patent Document 2: Japanese Patent Application Laid-Open No. 2003-518318

Patent Document 3: Japanese Patent Application Laid-Open No. 2004-99994

Patent Document 4: Japanese Patent Application Laid-Open No. H11-167861

Patent Document 5: Japanese Patent Application Laid-Open No. H7-320645

Patent Document 6: Japanese Patent Application Laid-Open No. 2003-7217

DISCLOSURE OF INVENTION

Problems to be Solved by the Invention

According to the plasma CVD method described above, although a dense silicon oxide film having a high voltage resistance characteristic can be formed, it is very difficult to form a glass film of more than a certain thickness (2 μm or more, for example). Although a method of forming a thick film through micro-level control of film stress has been discussed, the rate of film growth is approximately 100 nm/min or less, and so, for example, it takes one hour or longer to form a film with a thickness of 10 μm. Therefore, the glass film formation by the plasma CVD method is not suitable for mass-production of PDPs.

In addition, according to a method using a paste mixed with glass particles, although a thick glass film can be formed in a short period of time, there are cases where the binder is not completely removed and remains, and where foam is produced in the sintering process. Consequently, it is difficult to form a fine, homogeneous glass film and realize a high voltage resistance characteristic.

It is therefore an object of the present invention to provide a fine silicon oxide film, which has a high voltage resistance characteristic, and which is a glass film having a certain degree of thickness. This glass film is supposed to have high visible optical transparency and produces fine and adequate light scattering. In addition, it is also an object of the present invention to provide a method of producing the glass film in a short period of time.

It is furthermore an object of the present invention to provide an optical electronic device including the glass film (for the dielectric layer, for example). In particular, by applying the glass film of the present invention to the dielectric layer of a PDP, it is possible to provide a PDP with low discharge voltage and excellent light emission efficiency.

Means for Solving the Problem

The first aspect of the present invention relates to the following glass film manufacturing methods:

[1] A method for producing a glass film comprising the steps of: applying to a substrate a paste containing silica particles with an average particle size of 0.05 to 5 μm, an organic silicon compound which is in a liquid form at room temperature, an oxidizer, and a catalyst; and oxidizing the organic silicon compound contained in the applied paste.

[2] The method for producing the glass film of [1], in which the organic silicon compound comprises tetraethylorthosilicate.

[3] The method for producing the glass film of one of [1] and [2], in which the oxidizer comprises water or hydrogen peroxide.

[4] The method for producing the glass film of any one of [1] to [3], in which the mole ratio of the organic silicon compound and the oxidizer contained in the paste is 1:1.5 to 5.

[5] The method for producing the glass film of any one of [1] to [4], in which the catalyst comprises acid or alkali.

[6] The method for producing the glass film of any one of [1] to [5], in which the paste further contains alcohol.

[7] The method for producing the glass film of [6], in which the mole ratio of the organic silicon compound and the alcohol contained in the paste is 1:4 to 20.

[8] The method for producing the glass film of any one of [1] to [7], in which the silica particles comprise silicon oxide particles.

[9] The method for producing the glass film of any one of [1] to [8], in which the content of the silica particles in the paste is 1 to 30 volume percent with respect to a whole of the paste.

[10] The method for producing the glass film of any one of [1] to [9], in which the paste is subjected to vacuum defoaming.

[11] The method for producing the glass film of any one of [1] to [10], in which the paste is applied on the substrate by a die coating method, screen printing method, or a doctor blade method.

[12] The method for producing the glass film of any one of [1] to [11], in which the step of oxidizing the organic silicon compound is a step of radiating atmospheric plasma upon the applied paste.

[13] The method for producing the glass film of any one of [1] to [11], in which the step of oxidizing the organic silicon compound comprises a step of radiating ozone upon the applied paste.

[14] The method for producing the glass film of any one of [1] to [11], in which the step of oxidizing the organic silicon compound comprises a step of heating the applied paste to 400 to 600 degrees Celsius.

A second aspect of the present invention relates to the following glass films:

[15] A glass film comprising a silicon oxide film and silica particles with a particle size of 0.05 to 5 μm dispersed in the silicon oxide film.

[16] The glass film of [15], in which the volume ratio of silica particles in the glass film is 20 to 80 percent.

[17] The glass film of [15] or [16], in which the difference between a refractive index of the silicon oxide film and a refractive index of the silica particles is 0.001 to 0.1.

A third aspect of the present invention relates to the following plasma display panels:

[18] A method for producing plasma display comprising the steps of: applying a paste containing silica particles with an average particle size of 0.05 to 5 μm, an organic silicon compound which is in a liquid form at room temperature, an oxidizer, and a catalyst to a substrate on which a display electrode is provided; and oxidizing the organic silicon compound contained in the applied paste.

[19] A plasma display panel comprising a substrate on which a display electrode is provided, and a dielectric layer covering the substrate, in which the dielectric layer comprises a glass film comprising a silicon oxide film and silica particles with a particle size of 0.05 to 5 μm dispersed in the silicon oxide film.

ADVANTAGEOUS EFFECT OF THE INVENTION

According to the present invention, a glass film having high visible optical transparency and high voltage resistance characteristic can be produced (formed) in a short period of time. Therefore, by applying the present invention to optical electronic devices, especially to the formation of the dielectric layer of PDPs, PDPs with low discharge voltage and excellent light emission efficiency can be mass-produced.

BEST MODE FOR CARRYING OUT THE INVENTION

Figure 1:
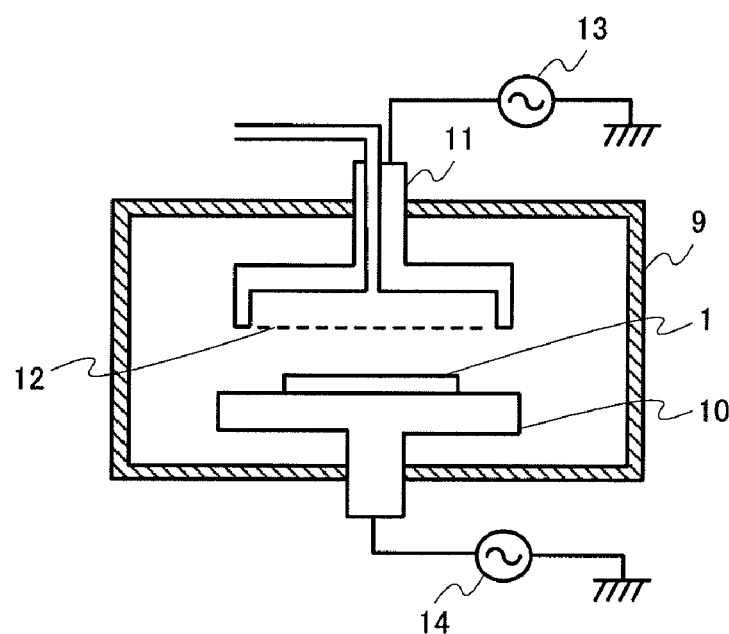
FIG. 1 is a view showing a plasma CVD apparatus.
Figure 2A:
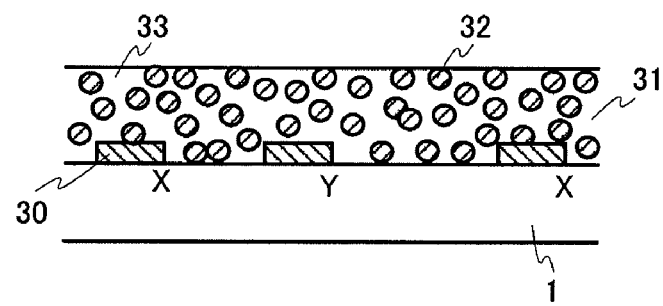
FIG. 2 is a view showing the steps of producing a glass film from a paste containing glass particles and binder.
Figure 2B:
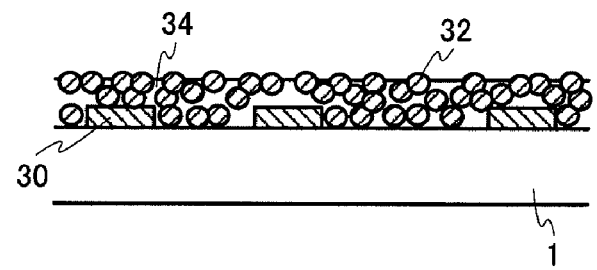
Figure 2C:
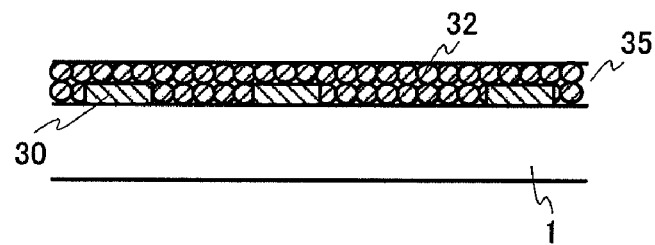
Figure 3:
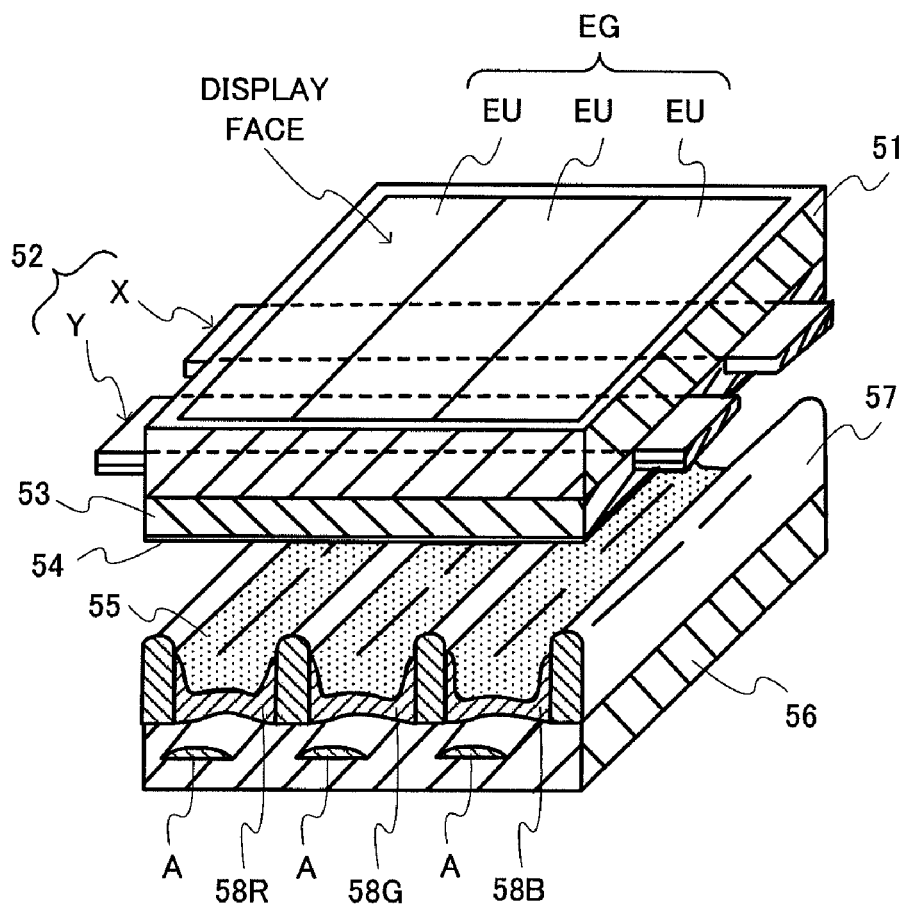
FIG. 3 is a view showing an exemplary structure of a plasma display panel.
Figure 4:
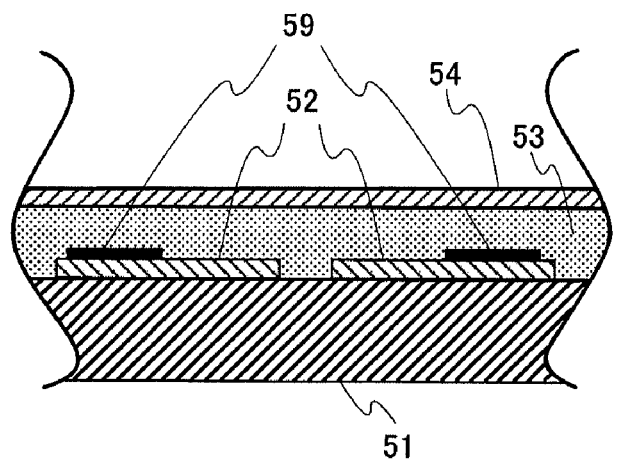
FIG. 4 is a view showing an exemplary structure of a front plate of a plasma display panel.
Figure 5:
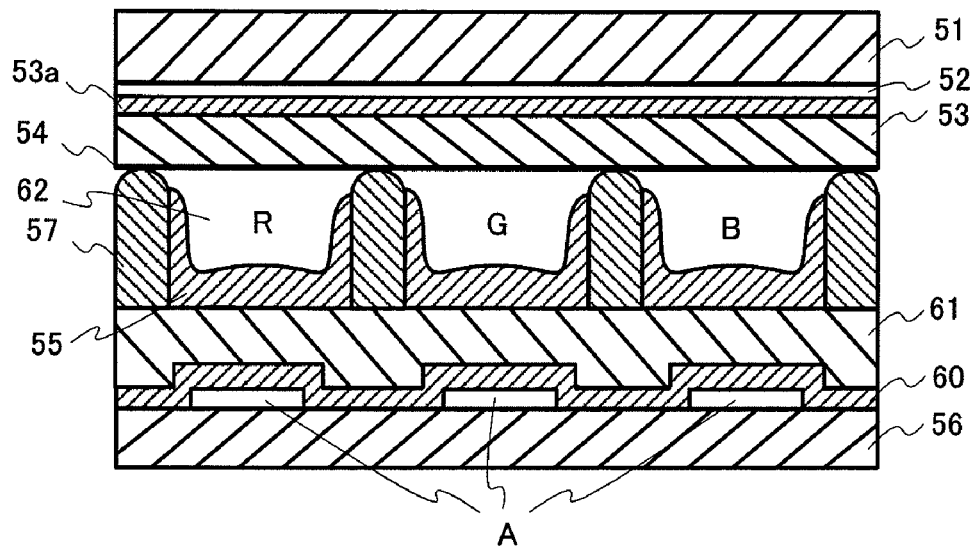
FIG. 5 is a view showing another exemplary structure of a plasma display panel.

1. The Method for Producing the Glass Film of the Present Invention

The method for producing the glass film of the present invention is characterized by including the steps of: applying to a substrate a paste containing silica particles with an average particle size of 0.05 to 5 μm, an organic silicon compound which is liquid at room temperature, an oxidizer and a catalyst; and oxidizing the organic silicon compound in the applied paste.

The particle size of silica particles contained in the paste of the present invention is preferably smaller than the thickness of the glass film to be produced but is by no means limited to this. For example, the average particle size is preferably 0.05 μm to 5 μm, and is more preferably 0.1 μm to 0.5 μm. If the particle size of silica particles is too small, the anchor effect in the glass film to be produced may not be sufficiently achieved. In addition, silica particles with a small particle size are generally expensive and can not be suitable for mass-production. The particle size of silica particles contained in the paste is measured by, for example, laser diffraction and scattering methods.

The particle size of silica particles may be uniform, but may have a distribution. If there is a certain range of particles size distribution, the density of silica particles in the glass film to be produced can be increased.

Silica particles in the glass film to be produced show the anchor effect to prevent cracks in the glass film. Therefore, the thickness of the glass film to be produced can be increased.

The silica particles are preferably silicon oxide particles. The silica particles may be spherical silica or milled silica as well. The anchor effect of milled silica in the glass film may be higher than that of spherical silica. In addition, silica particles may be fused silica (i.e., quartz glass). Fused silica has high purity of silicon oxide, so that the purity of the glass film to be produced can be increased.

Silica particles may be produced by arbitrary methods described in various publications including: Japanese Patent Application Laid-open No. H10-287415; Japanese Patent Application Laid-open No. S62-153110; Japanese Patent Application Laid-open No. S62-52119; Japanese Patent Application Laid-open No. S62-241541; Japanese Patent Application Laid-open No. S58-145163; Japanese Patent Application Laid-open No. H7-277724; and Tosoh Research/Technical Report Vol. 45 (2001) 65-69.

In addition, the content of silica particles in the paste is 1 to 30 volume percent, with respect to the total volume of the applied paste. If the content of silica particles is too low, the quantity of the organic silicon compound increases relatively, and consequently, the period for the later step of oxidizing the organic silicon compound is extended, or alternatively, the compound may remain without being oxidized. On the other hand, if the content of silica particles is too large, it becomes difficult to make a glass film in which silica particles are uniformly distributed.

The organic silicon compound contained in the paste is not particularly limited as long as it provides silicon oxide through oxidization, but its main component is preferably tetraalkylorthosilicate (e.g., tetraethylorthosilicate (TEOS)). The "main" component suggests 50 mol percent or more, or, more preferably, 80 mol percent or more. In addition, the organic silicon compound contained in the paste may be entirely tetraalkylorthosilicate.

Although the main component of the organic silicon compound contained in the paste is preferably TEOS, other types of organic silicon compound may be contained as well. Example of other organic silicon compound includes tetramethylsilane (TMS).

The oxidizer contained in the paste is preferably water ($H_2O$) or hydrogen peroxide ($H_2O_2$), because these can be removed at ease from the glass film to be produced. And these can oxidize well the silicon compound, and are inexpensive.

The mole ratio of the oxidizer (preferably, water) to the organic silicon compound contained in the paste is preferably 1:1.5 to 5. If the mole ratio is lower than 1.5, the non-reactive portion of the organic silicon compound might remain in the glass film that is produced, in which case a porous glass film is formed. On the other hand, if the mole ratio is higher than 5, the shrinkage factor increases in drying/firing in the glass film producing process, and consequently, it more likely that the glass film cracks and the glass film peels from the substrate.

As for the catalyst contained in the paste, any catalyst may be used as long as it promotes oxidization of the organic silicon compound and may be either acid catalyst or base catalyst. Hydrogen chloride (HCl) is an example of acidic catalyst, and ammonium hydroxide ($NH_4OH$) is an example of base catalyst. These inorganic catalysts have adequate oxidizing catalytic capacity, can be removed at ease from the formed glass film, and are inexpensive. Further, the organic silicon compound and the oxidizer can be mixed to a homogeneous state.

While the quantity of catalysts contained in the paste is not particularly limited, for example, 0.005 mole to 0.03 mole of hydrogen chloride may be provided for one mole of organic silicon compound. If the quantity of the catalyst is too little, the curing of the glass film (oxidization of organic silicon compound) is delayed. On the other hand, if the quantity is too large, the glass film may be cured before reaching a sufficient level of adhesion to the substrate.

The paste may contain arbitrary components in addition to silica particles, organic silicon compound, oxidizer, and catalyst. Examples of arbitrary components include alcohol. Alcohol makes possible an improved mixture state of the organic silicon compound and the oxidizer, that is, a homogeneous mixture state. Preferred examples of alcohol include methanol and ethanol.

The quantity of alcohol contained in the paste is preferably 4 to 20 moles for one mole of organic silicon compound. If the content of alcohol is too little, the organic silicon compound and the oxidizer may not be homogenously mixed with each other, which then results in irregularities in the glass film produced. Further, the rate of oxidation reaction becomes too fast, and the glass film may not adhere to the substrate. On the other hand, if the content is too large, the curing of the film (oxidization of organic silicon compound) is delayed and the period for producing the glass film is extended, and in addition, upon drying and sintering, excessive shrinkage may occur, which then results in cracks in the glass film and peeling from the substrate.

The paste may contain other solvents. Examples of other solvents include terpineol and butyl butyl carbitol acetate. In addition, a thickener may be added to the paste so as to adjust the viscosity adequately.

In addition, the paste to be applied on the substrate is preferably subjected to defoaming processing, so that a fine glass film having a high voltage resistant characteristic can be obtained. The defoaming processing is carried out by stirring in vacuum, for example.

While the paste is applied on the substrate, the means of coating is not particularly limited. For example, the paste is applied by the die coating method, screen printing method or doctor blade method, because these methods accelerate the rate of coating and the coating layer can be produced in a short period of time. The quantity of paste to be applied on the substrate is adequately selected according to the quantity of organic silicon compound and silica particles contained in the paste, and the thickness of the glass film to be produced.

The organic silicon compound contained in the paste applied on the substrate is oxidized. The organic silicon compound is oxidized to become silicon oxide. While the means of oxidization is not particularly limited, it is preferable to radiate atmospheric plasma on the applied paste, to radiate ozone on the applied paste, or heat the applied paste. Oxidization is carried out rapidly by these means.

Figure 6:
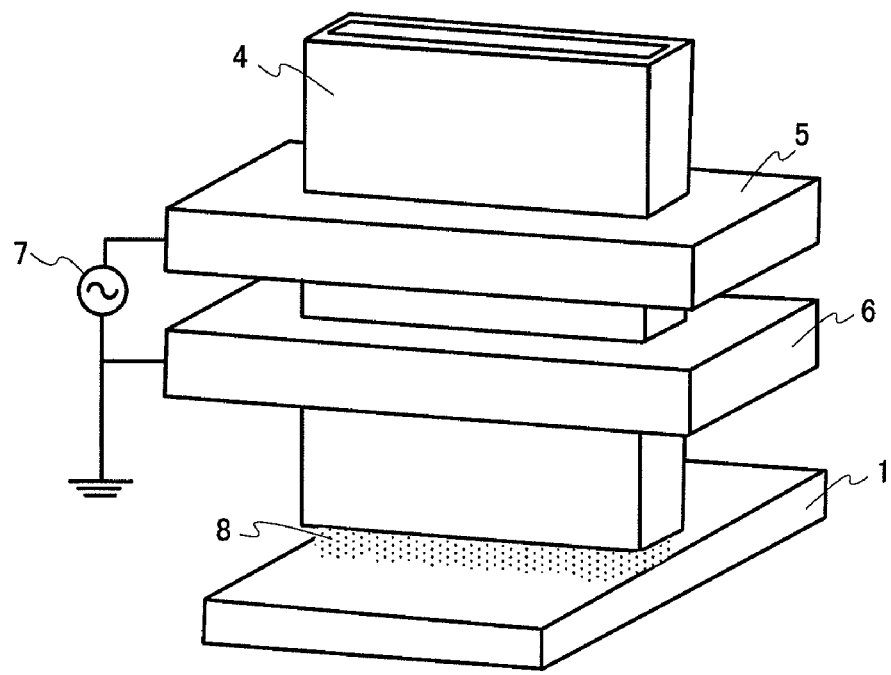
FIG. 6 is a view showing an example of an atmospheric plasma processing apparatus for carrying out a method for producing glass film of the present invention.

To radiate atmospheric plasma upon the applied paste, atmospheric plasma processing apparatus may be used. FIG. 6 is a perspective view showing a schematic configuration of the atmospheric plasma processing apparatus. High frequency electrode 5 and grounding electrode 6 are provided around dielectric tube 4. By supplying high frequency power (13.56 MHz, for example) from high frequency power source 7 to high frequency electrode 5, atmospheric plasma is generated in dielectric tube 4 through which a helium gas and an oxygen gas is supplied downward in the figure. Active particle flow 8 in the atmospheric plasma is sprayed over the paste applied to the substrate. Active particle flow 8 contains a large amount of oxygen radicals produced by decomposition of the source gas, and oxidizes the organic silicon compound contained in the paste applied on the substrate. Provided that the temperature of active particle flow 8 as a gas is several hundreds of degrees Celsius, it is possible to heat only the paste applied on substrate 1.

To radiate ozone upon the applied paste, the ozone produced by discharge or ultraviolet rays needs only to be guided to the vicinity of the substrate. In addition, to heat the applied paste, it is sufficient to sinter the substrate in a furnace, and the heating temperature is preferably 400 to 600 degrees Celsius.

The oxidization of the organic silicon compound is more preferably carried out by radiation of atmospheric plasma. Ozone is likely to be contained in the active particle flow of atmospheric plasma, so that oxidization can be carried out rapidly at a relatively low temperature.

The paste applied on the substrate contains silica particles, and so the silicon oxide generated from the organic silicon compound may be only part of the glass film to be produced. Therefore, the glass film can be produced in a short period of time.

2. The Glass Film of the Present Invention

Figure 7:
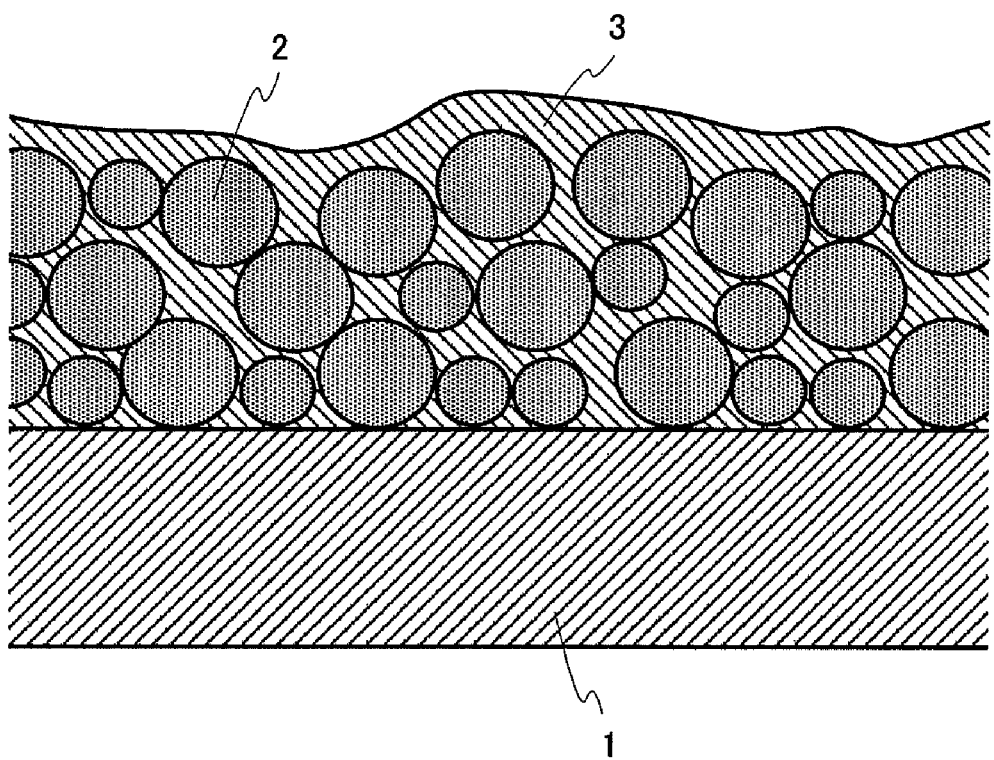
FIG. 7 is a view schematically showing a glass film of the present invention.

The glass film of the present invention is characterized by containing a silicon oxide film and silica particles dispersed in the silicon oxide film, which have an average particle size of 0.05 µm to 5 µm, more preferably 0.1 µm to 0.5 µm. FIG. 7 schematically shows a structure of the glass film of the present invention. In FIG. 7, a glass film including silicon oxide film 3 and silica particles 2 dispersed therein is formed on substrate 1.

The silica particles contained in the glass film are the same as the silica particles contained on the paste described above. The average particle size of silica particles contained in the glass film can be measured by image processing methods from a cross-sectional image (a SEM image, for example) of the glass film.

While the glass film of the present invention contains a silicon oxide film and silica particles dispersed therein, if the silica particles were silicon oxide particles, a film with high homogeneity would be made from the same material. A glass film made of silicon oxide has a high voltage resistance characteristic and high visible optical transparency.

It is preferable that the volume ratio of silica particles in the glass film of the present invention is 20 to 80 percent, and more preferably, 40 to 60 percent. If the volume ratio is lower than 20 percent, part of the organic silicon compound, that should be oxidized and become silicon oxide, is not oxidized and remains. And consequently, there is a risk that the voltage-resistance characteristic of the glass film is impaired overtime. On the other hand, if the volume ratio is higher than 80 percent, depressions and projections cause by the silica particles may remain on the surface of the glass film, and so there are cases where a smooth film surface cannot be obtained. The volume ratio of silica particles in the glass film can be calculated from a cross-sectional image (SEM image, for example) of the film.

The difference between the refractive index of the silica particles and the refractive index of a silicon oxide film contained in the glass film of the present invention is preferably 0.001 to 0.1. If the difference of the refractive index is too large, the haze value (i.e. the degree of cloudiness) increases and visible optical transparency decreases. Thus, it is not preferable to use the glass film as a dielectric layer of a PDP, for example. If the refractive index difference is adequate, adequate light scattering may be generated in the glass film. Further, the haze value of the glass film of the present invention is preferably approximately 17. The refractive index for silica particles can be adjusted by their production conditions, and the refractive index for a silicon oxide film can be also adjusted by adjusting the types of organic silicon compounds to be oxidized and additives.

The glass film of the present invention contains silica particles so that the thickness can be increased. In addition, the thickness of the glass film of the present invention can be adjusted adequately depending on use application. For example, in the case where the glass film of the present invention is applied to a dielectric layer of a plasma display panel, the thickness of the glass film is preferably 10 µm or more.

The glass film of the present invention is preferably placed on the substrate. While a type for the substrate is not particularly limited, in the case where the glass film is used as a dielectric layer for a PDP, a glass substrate on which display electrodes are provided may be used as the substrate.

The glass film of the present invention is used for arbitrary use application. For example, the glass film may be used as an optical waveguide for optical electronic devices and may be use as a display or a dielectric layer for plasma displays.

In addition, the glass film of the present invention provides light scattering and can be used as a water repellant material or a stain proof material for the floor and walls of bathrooms or sanitary ceramics. Further, if depressions and projections are provided to increase the specific surface area, the glass film may be used as a catalytic substrate for exhaust gas processing use.

3. Plasma Display Panel of the Present Invention

The plasma display panel (PDP) of the present invention is characterized by including the above-described glass film of the present invention as a dielectric layer. The dielectric layer of a PDP is formed on a substrate on which display electrodes are provided. The glass film composing the dielectric layer of a PDP preferably has a thickness of 10 μm or more. In addition, it is necessary to apply high voltage to a discharge space via the dielectric layer, therefore the glass film composing the dielectric layer requires a high voltage resistance characteristic. Of course, high optical transparency is also required.

The PDP of the present invention is produced by a method including the steps of: applying the above-described paste on a substrate on which display electrodes are provided; and oxidizing an organic silicon compound contained in the applied paste.

EXAMPLE

Although the present invention will be described below in detail with reference to an example, the scope of the invention is by no means limited to this.

A paste is obtained by adding silica particles (particle size: 0.3 μm) to a mixture obtained by mixing tetraethoxyorthosilicate (TEOS), water, hydrochloric acid, and ethanol at a mole ratio of 1:2:0.015:8.2. The volume ratio of silica particles is 25 volume percent. The obtained paste is applied on a glass substrate by a die coating method. The coating is naturally dried for 60 minutes at room temperature, heated to 500 degrees Celsius over 120 minutes, maintained at 500 degrees Celsius 5 minutes to be dried with heat, and cooled naturally, and thus a glass film is obtained.

INDUSTRIAL APPLICABILITY

The glass film provided according to the present invention is produced in a short period of time and can show a high voltage resistance characteristic and high optical transparency. Therefore, the glass film is preferably applied to an optical electronic device, and in particular, is preferably applied to a dielectric layer of the PDP.

The present application is based on Japanese Patent Application No. 2005-243837, filed on Aug. 25, 2005, the entire content of which is expressly incorporated by reference herein.

The invention claimed is:

1. A method for producing a glass film comprising a silicon dioxide film and silica particles, the method comprising:
    applying onto a substrate a paste containing silica particles with an average particle size of 0.05 to 5 μm, an organic silicon compound which is in a liquid form at room temperature, an oxidizer, and a catalyst; and
    oxidizing the organic silicon compound contained in the applied paste,
    wherein a content of the silica particles in the paste is 1 to 30 volume percent based on a total volume of the paste and a volume ratio of the silica particles in the glass film is 20 to 80 percent.

2. The method for producing the glass film according to claim 1, wherein the organic silicon compound comprises tetraethylorthosilicate.

3. The method for producing the glass film according to claim 1, wherein the oxidizer comprises water or hydrogen peroxide.

4. The method for producing the glass film according to claim 1, wherein a mole ratio of the organic silicon compound and the oxidizer contained in the paste is 1:1.5 to 5.

5. The method for producing the glass film according to claim 1, wherein the catalyst comprises acid or alkali.

6. The method for producing the glass film according to claim 1, wherein the paste further contains alcohol.

7. The method for producing the glass film according to claim 6, wherein a mole ratio of the organic silicon compound and the alcohol contained in the paste is 1:4 to 20.

8. The method for producing the glass film according to claim 1, wherein the silica particles comprise silicon oxide particles.

9. The method for producing the glass film according to claim 1, wherein the paste is subjected to vacuum defoaming.

10. The method for producing the glass film according to claim 1, wherein the paste is applied on the substrate by a die coating method, screen printing method, or a doctor blade method.

11. The method for producing the glass film according to claim 1, wherein the step of oxidizing the organic silicon compound is a step of radiating atmospheric plasma upon the applied paste.

12. The method for producing the glass film according to claim 1, wherein the step of oxidizing the organic silicon compound comprises a step of radiating ozone upon the applied paste.

13. The method for producing the glass film according to claim 1, wherein the step of oxidizing the organic silicon compound comprises a step of heating the applied paste to 400 to 600 degrees Celsius.

14. The method for producing the glass film according to claim 1, wherein the paste does not comprise an organic silicon compound having non-hydrolyzable organic groups.

15. The method for producing the glass film according to claim 1, wherein the paste comprises as only organic silicon compound tetraalkylorthosilicate.

16. A glass film comprising a silicon oxide film and silica particles with a particle size of 0.05 to 5 μm dispersed in the silicon oxide film, wherein a volume ratio of silica particles in the glass film is 20 to 80 percent.

17. The glass film according to claim 16, wherein a difference between a refractive index of the silicon oxide film and a refractive index of the silica particles is 0.001 to 0.1.

18. A method for producing a plasma display comprising:
    applying a paste containing silica particles with an average particle size of 0.05 to 5 μm, an organic silicon compound which is in a liquid form at room temperature, an oxidizer, and a catalyst to a substrate on which a display electrode is provided; and
    oxidizing the organic silicon compound contained in the applied paste,
    wherein a content of the silica particles in the paste is 1 to 30 volume percent based on a total volume of the paste and a volume ratio of the silica particles in the glass film is 20 to 80 percent.

19. A plasma display panel comprising a substrate on which a display electrode is provided, and a dielectric layer covering the substrate,
    wherein the dielectric layer comprises a glass film comprising a silicon oxide film and silica particles with a particle size of 0.05 to 5 μm dispersed in the silicon oxide film,
    wherein a volume ratio of the silica particles in the glass film is 20 to 80 percent.

* * * * *